United States Patent
Yamaguchi et al.

(10) Patent No.: US 7,222,784 B2
(45) Date of Patent: May 29, 2007

(54) TRANSMISSION BASE FLOW CONTROL DEVICE

(75) Inventors: Tomoyuki Yamaguchi, Kawasaki (JP); Shinji Wakasa, Kawasaki (JP); Yasuyuki Mitsumori, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/284,669

(22) Filed: Nov. 22, 2005

(65) Prior Publication Data
US 2006/0077898 A1   Apr. 13, 2006

Related U.S. Application Data

(63) Continuation of application No. PCT/JP03/009199, filed on Jul. 18, 2003.

(51) Int. Cl.
*G06K 5/00*   (2006.01)

(52) U.S. Cl. ...................................... 235/380; 370/229

(58) Field of Classification Search ................ 235/380, 235/492; 705/14, 17; 370/331, 389, 235, 370/252, 229, 329, 258, 402, 396, 414
See application file for complete search history.

(56) References Cited

U.S. PATENT DOCUMENTS

| | | | | |
|---|---|---|---|---|
| 5,497,377 A | * | 3/1996 | Muto et al. ................... | 714/715 |
| 5,583,301 A | * | 12/1996 | Strauss et al. ............ | 73/861.29 |
| 5,671,213 A | | 9/1997 | Kurano | |
| 5,806,045 A | * | 9/1998 | Biorge et al. .................. | 705/14 |
| 5,999,518 A | * | 12/1999 | Nattkemper et al. ......... | 370/258 |
| 6,078,565 A | | 6/2000 | Ben-Michael et al. | |
| 6,141,346 A | | 10/2000 | Caldara et al. | |
| 6,249,756 B1 | * | 6/2001 | Bunton et al. ................. | 703/25 |
| 2002/0011949 A1 | * | 1/2002 | Rudow et al. ......... | 342/357.06 |
| 2002/0105905 A1 | * | 8/2002 | Boyle et al. ................. | 370/229 |
| 2005/0047405 A1 | * | 3/2005 | Denzel et al. .............. | 370/388 |
| 2005/0259651 A1 | * | 11/2005 | Yashima ..................... | 370/389 |
| 2006/0077898 A1 | * | 4/2006 | Yamaguchi et al. ......... | 370/235 |
| 2006/0146749 A1 | * | 7/2006 | Lundh et al. ............... | 370/331 |

FOREIGN PATENT DOCUMENTS

JP   3-128547   5/1991

(Continued)

OTHER PUBLICATIONS

International Search Report dated Oct. 28, 2003.

*Primary Examiner*—Thien M. Le
(74) *Attorney, Agent, or Firm*—Katten Muchin Rosenman LLP (57) ABSTRACT

A transmission base flow control device including a first credit counter, shared by an active system and a preparatory system of a reception device, managing a credit value of the active system; a second credit counter and a third credit counter counting the credit values for each system of the active system and the preparatory system of the reception device; a differential counter holding a difference between the credit value counted by the second credit counter and the credit value counted by the third credit counter; and a control unit matching, according to the difference held by the differential counter, the credit values of the first credit counter and the second credit counter or the credit values of the first credit counter and the third credit counter with a credit value corresponding to the reception device of a new active system after switching the system of the reception device.

7 Claims, 13 Drawing Sheets

FOREIGN PATENT DOCUMENTS

| | | |
|---|---|---|
| JP | 5-056065 | 3/1993 |
| JP | 8-139726 | 5/1996 |
| JP | 11-027291 | 1/1999 |
| JP | 11-510328 | 9/1999 |
| JP | 2000-232477 | 8/2000 |
| WO | WO 97/04548 | 2/1997 |

* cited by examiner

TRANSMISSION BASE FLOW CONTROL DEVICE

CROSS-REFERENCE TO RELATED APPLICATION

This is a continuation of application PCT/JP2003/009199, filed on Jul. 18, 2003, now pending, the contents of which are herein wholly incorporated by reference.

BACKGROUND OF THE INVENTION

The present invention relates to a flow control technique in data transmission/reception between a transmission device and a reception device, and more particularly to a flow control technique of credit base in data transmission/reception between a transmission device and a reception device having a redundant structure.

In general, a flow control in data transmission/reception between a transmission device and a reception device implies an operation of the reception device (reception side) to stop data transmission from the transmission device (transmission side) before the reception side becomes at a reception disable state, when the transmission side transmits data, for example, in a packet form of a fixed length or variable length to the reception side.

As kinds of the flow control, there are: a flow control of reception base where a state of the reception side (for example, a data accumulation state) is self-monitored, and the reception side notifies the transmission side of a data reception enable state or data reception disable state by using a resumption signal or transient stop (wait) signal (Rdy/Full, XON/XOFF, or the like); and a flow control of transmission base such as a credit base flow control, to which the present invention relates.

Figure 1:
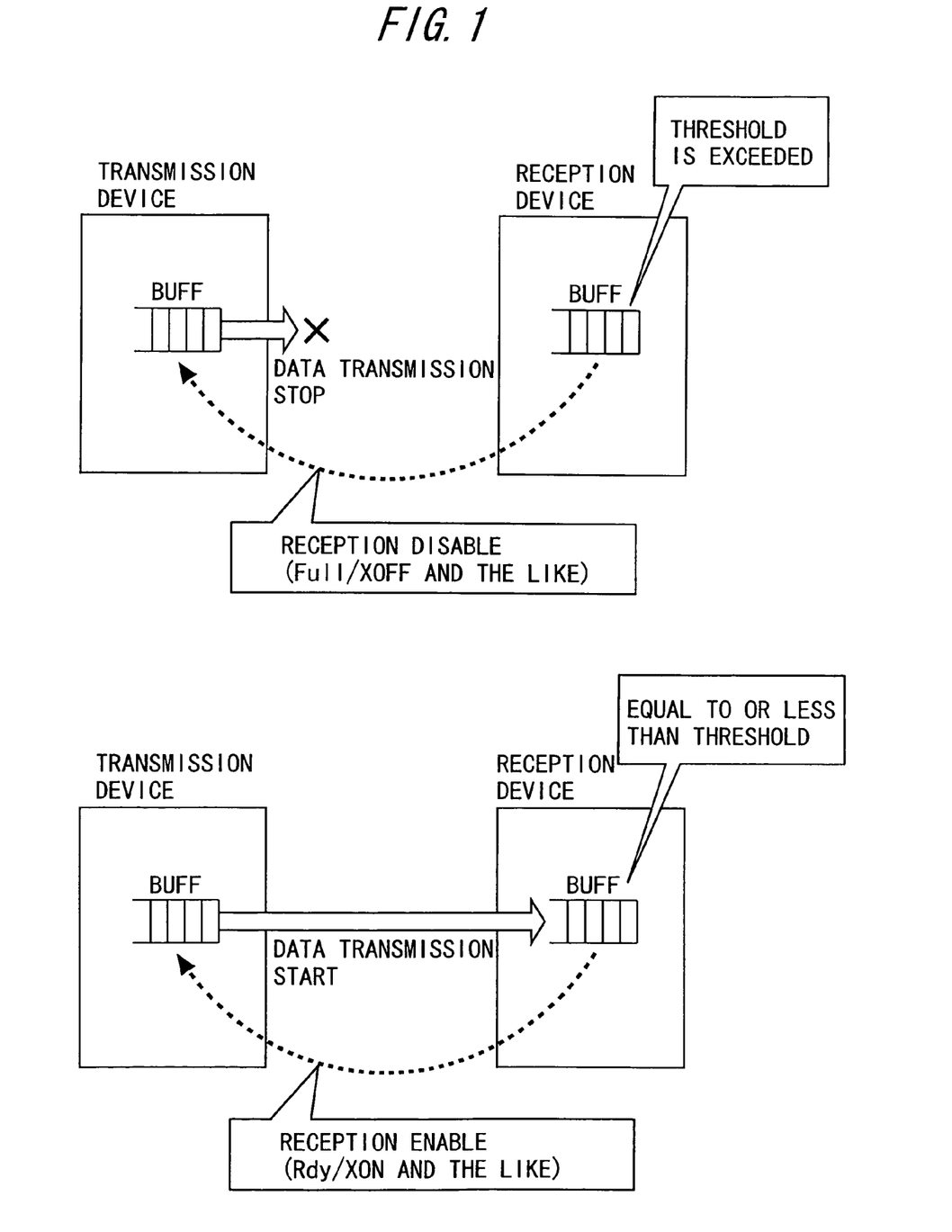
FIG. 1 is a view for explaining a flow control of reception base.

In the case of the flow control of the reception base (refer to FIG. 1), the reception enable state or reception disable state of the reception side is notified to the transmission side through a different line (a line different from a packet transmission route) or through in-band transmission (any field of a packet).

In this flow control, a state of the reception side shows that data can be transmitted from the transmission side or not. As long as any report is continuously transmitted from the reception side, the flow control functions without any problem in spite of the employment of the redundant structure. Also, since the operation is also simple, this flow control is often used in a data transmission device such as a router and a switchboard.

However, in the flow control of the reception base, the reception side needs to self-monitor and control a threshold of a buffer (buffer memory, Buff). Thus, the reception side needs to include a buffer having a memory capacity large enough therefore, and the latency of a state report is also required to be considered as the buffer endurance. Hence, an increase in the memory capacity of the buffer cannot be avoided.

Figure 2:
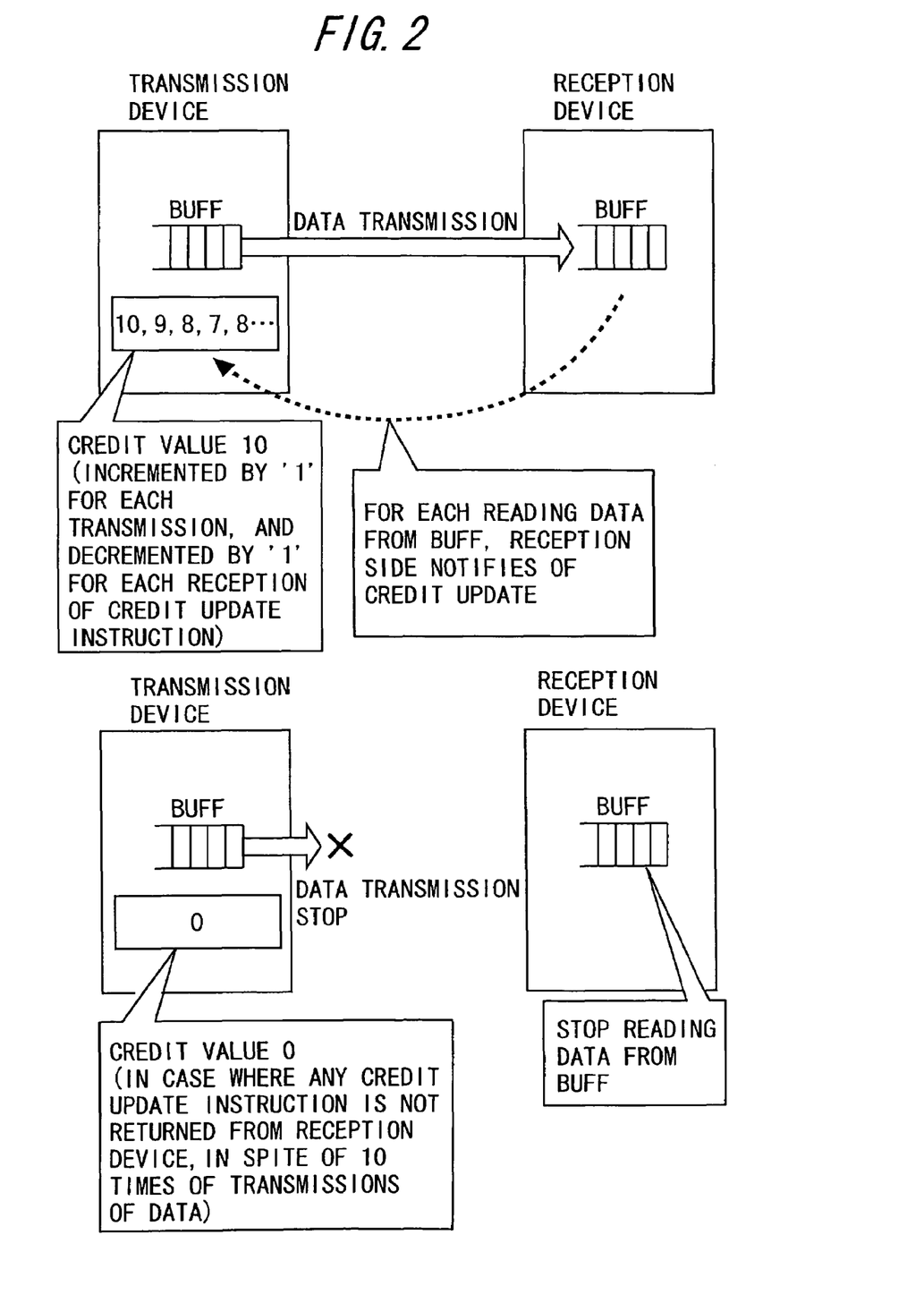
FIG. 2 is a view for explaining a flow control of transmission base.

On the other hand, in the flow control of the transmission base, to which the present invention relates, namely, in the credit base flow control (FIG. 2), the control is performed such that, each time the transmission side carries out data transmission, a credit value is subtracted by "1", and when the credit value becomes "0", the data transmission is not executed any longer. The reception side instructs the transmission side to carry out the operation of a credit update and add "1" to the credit value, when the process of data transmitted from the transmission side is ended.

In this flow control, since the credit value of the transmission side is set and controlled, a buffer amount in the reception side can be decreased. Also, the transmission side can easily limit on traffic. Thus, there is a merit where the compatibility with an application of a band control is high.

However, unlike the flow control of the reception base, the credit value is required to be managed, which makes the control complex. When the credit value is used between the transmission and reception devices employing a redundant structure, at a time of system switching, the credit values of the reception devices may be different depending on the degree of reading data from the buffer in each system. Because of such problems, the credit value is not applied to the flow control of a redundant structure device.

Note that conventionally, in a duplex ATM (Asynchronous Transfer Mode) switch and the like, there are techniques for switching a system without generating a cell loss. However, they are just proposals of a method of preventing the cell loss.

Here, assuming that the credit base flow control is applied to an edge router serving as a data transmission device of N (N=2) multiplexed configuration, a cell as a fixed length packet is copied from a traffic manager side serving as the transmission side to a main switch side of the N-multiplexed configuration serving as the reception side.

At this time, the cell transmission situation is different between an ACT system (active system) and an SBY system (preparatory system/standby system) due to the congestion state of the cell inside the main switch, a frequency error of an oscillator in each main switch, and the like.

This results in a difference in the credit value between the ACT system main switch and the SBY system main switch. However, when the system switching occurs in this condition, since a credit value of the traffic manager is originally synchronous with a credit value of an old ACT system main switch, a mismatching with a credit value of a new ACT system main switch is induced. The mismatching with this credit value brings about problems of the drop in the throughput inside the main switch after the system switching, and the overflow or underflow of a FIFO (First in First out) buffer memory.

The following are related arts to the present invention.

[Patent Document 1]
  Japanese Patent Laid-Open Publication No. 03-128547

[Patent Document 2]
  Japanese Patent Laid-Open Publication No. 05-56065

DETAILED DESCRIPTION OF THE PREFERRED EMBODIMENTS

An object of the present invention is to provide a transmission base flow control technique which avoids a situation where a flow control does not function normally because credit values are mismatched between reception devices having a redundant structure, when an active system and a preparatory system are switched.

According to the present invention, there is provided a transmission base flow control device which performs data transmission/reception based on a packet form between a transmission device and a reception device having a redundant structure by utilizing a credit value to perform a flow control of a credit base on a flow basis, including:

a first credit counter, which is shared by an active system and a preparatory system of the reception device, for managing the credit value of the active system;

a second credit counter and a third credit counter for counting the credit values for each system of the active system and the preparatory system of the reception device;

a differential counter for holding a difference between the credit value counted by the second credit counter and the credit value counted by the third credit counter; and a control unit for matching, according to the difference held by the differential counter, the credit values of the first credit counter and the second credit counter or the credit values of the first credit counter and the third credit counter with a credit value corresponding to the reception device of a new active system after switching the system of the reception device.

In the transmission base flow control device adopting the above-described configuration, the differential counter holds a difference between the credit value counted by the second credit counter and the credit value counted by the third credit counter, at the time of switching the system of the reception device.

Also, in the transmission base flow control device, the transmission device is a traffic manager having a traffic processing function and a routing processing function on a flow basis, and the reception device is a switch for switching a packet of an accumulation state in a buffer memory on a fixed length packet basis.

Also, in the transmission base flow control device, the control unit matches, according to the difference held by the differential counter, the credit values of the first credit counter and the second credit counter or the credit values of the first credit counter and the third credit counter with a credit value corresponding to a packet number remaining in the buffer memory in the reception device of the new active system after switching the system of the reception device.

Also, in the transmission base flow control device, the reception device of the new active system transmits a credit update packet to the transmission device when the differential counter indicates the difference of a negative value, in order to match the credit value corresponding to the reception device of the new active system, the credit value of the first credit counter, and the credit value of the second credit counter or the third credit counter corresponding to the new active system, with one another.

Also, in the transmission base flow control device, the transmission device discards the credit update packet transmitted thereto from the reception device of the new active system when the differential counter indicates the difference of a positive value, in order to match the credit value corresponding to the reception device of the new active system, the credit value of the first credit counter, and the credit value of the second credit counter or the third credit counter corresponding to the new active system, with one another.

Further, in the transmission base flow control device, the transmission device transmits a credit information collection data to the reception device, and the credit value corresponding to the reception device of the active system is collected, and according to the collected credit value, the credit value of the first credit counter is matched with the credit value of the second credit counter or the third credit counter corresponding to the active system.

DETAILED DESCRIPTION OF THE PREFERRED EMBODIMENTS

An embodiment of the present invention will be described below with reference to the drawings.

[Schema of Transmission Base Flow Control Device]

Figure 3:
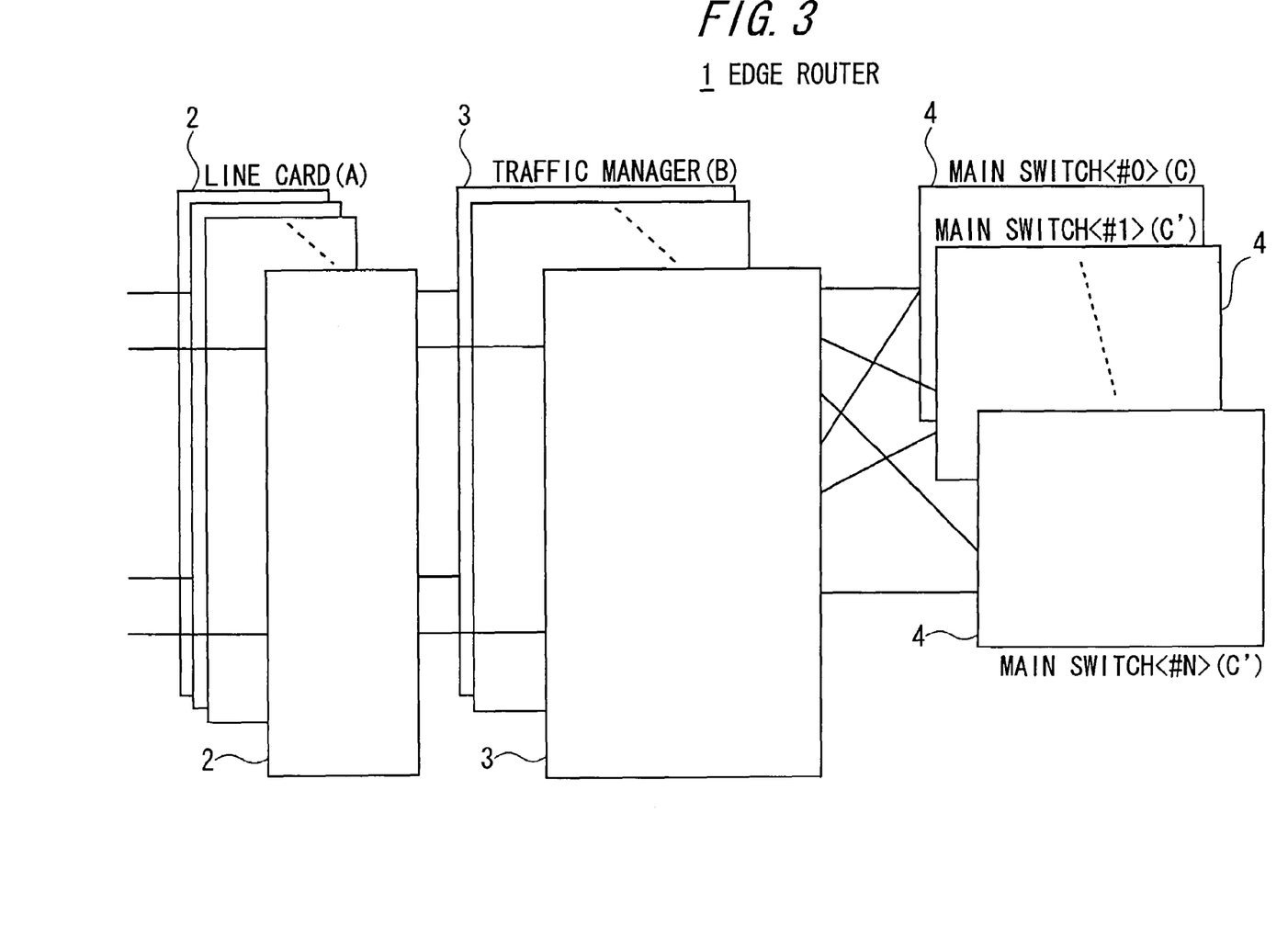
FIG. 3 is a block diagram showing a schema of a transmission base flow control device according to an embodiment of the present invention.

FIG. 3 shows a configuration of an edge router 1 serving as a transmission base flow control device (data transmission device) to which the present invention is applied. The edge router 1 is used for Internet service providers (ISPs) or carriers (communications carrier or communications companies) and placed at an inlet or outlet of an IP (Internet Protocol) network.

The edge router 1 is provided with: a plurality of line cards (A) 2 each accommodating a line connected to a subscriber (subscriber terminal) which is not shown; a plurality of traffic managers (B) 3 each having a traffic processing function and a routing processing function on a flow basis; and a plurality of main switches (C), (C') 4 for carrying out switching on a fixed length packet (cell) basis.

The line cards 2 can terminate lines of an Ether system of OC3 (Optical Carrier Level 3)/OC12 (Optical Carrier Level 12)/GbE (Gigabit Ethernet)/10M, 100M and the like. The traffic managers 3 and the main switches 4 constitute transmission devices (transmission sides) and reception devices (reception sides) in the transmission base flow control device exemplified here.

Although a redundant structure can be employed for any of the line card 2, traffic manager 3, and main switch 4, an example is shown here in which the redundant structure, namely, a duplex structure is employed for only the main switch 4 serving as the reception device.

As shown in FIG. 3, since each traffic manager 3 is connected to the N (N=3) main switches 4, the main switches 4 have an N (N=3) multiplexed configuration. In the edge router 1, one of the N main switches 4 acts as an ACT system (active system), and all of the others act (hot standby operation) as an SBY system (preparatory system/ standby system). However, since only one of the main switches 4 in the SBY system actually function, this is defined as the duplex structure.

[Schema of Traffic Manager and Main Switch]

Figure 4:
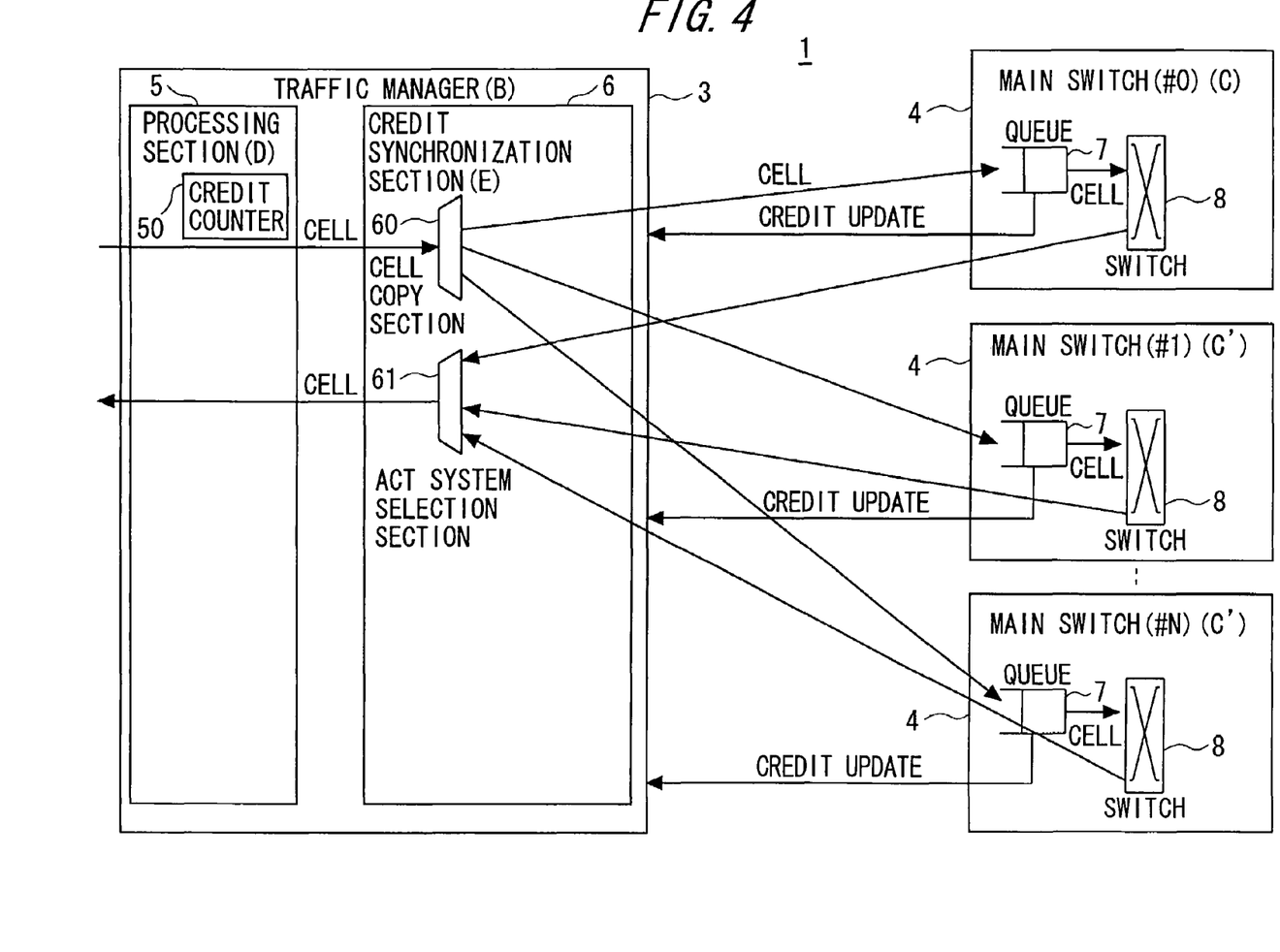
FIG. 4 is a block diagram showing schemas of a traffic manager and a main switch shown in FIG. 3.

FIG. 4 is a block diagram showing detailed configurations of the traffic manager 3 and the main switch 4 shown in FIG. 3.

The traffic manager 3 in the edge router 1 has the traffic processing function and the routing processing function on a flow basis and also includes a processing section (D) 5 including a credit counter 50 and a credit synchronization section (E) 6, which will be described later.

A plurality of cells (strictly, an IP packet composed of a plurality of cells) inputted to the traffic manager 3 from the line card 2 (refer to FIG. 3) are subjected to predetermined routing process and traffic process in the processing section 5, and then copied to the N main switches 4 by a cell copy section 60 of the credit synchronization section 6.

The cells inputted to each main switch 4 from the credit synchronization section 6 are transiently accumulated in a buffer (queue) 7 and then switched on a cell basis by a switch 8 based on switching tag information embedded in the headers of the cells and outputted to the corresponding traffic manager 3.

Among the already-switched cells that are inputted to the traffic manager 3 from each main switch 4, only a cell of the ACT system is selected by an ACT system selection section 61 in the credit synchronization section 6 and again passes through the processing section 5 to be outputted to the line card 2.

[Details of Traffic Manager and Main Switch (First Operation Example)]

Figure 5:
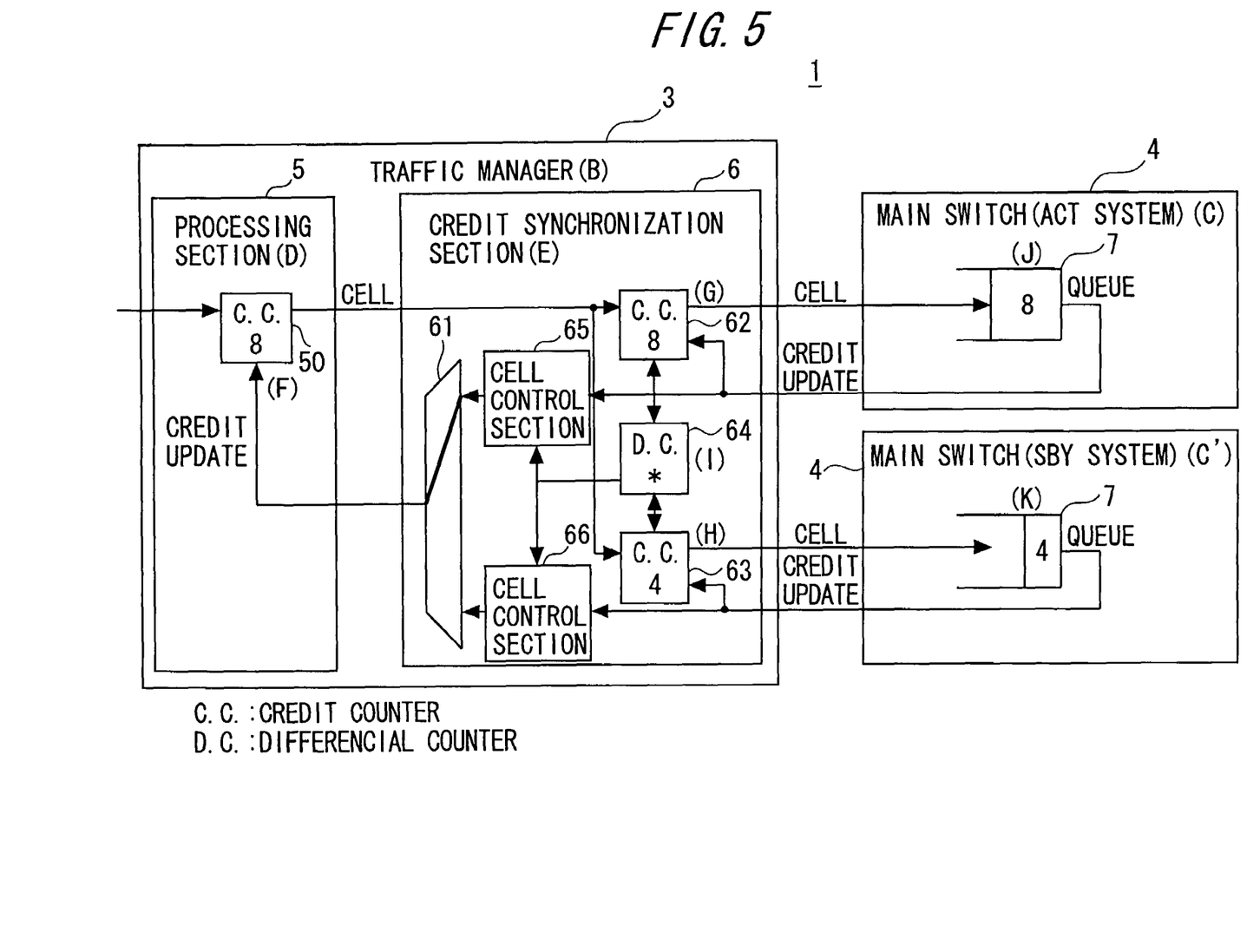
FIG. 5 is a block diagram showing details (including a first operation example) of the traffic manager and the main switch shown in FIG. 3.

FIG. 5 is a block diagram showing the further detailed configuration of the traffic manager 3 shown in FIG. 4. In FIG. 5 and subsequent drawings to be referred to later, the main switches 4 are illustrated limiting to two switches of the ACT system and the SBY system.

The processing section 5 in the traffic manager 3 has a singly multiplexed structure including the credit counter (F) 50. Also, the credit synchronization section 6 in the traffic manager 3 includes credit counters (G, H) 62, 63 for each of the ACT system and the SBY system and a differential counter (I) 64 for holding a difference between the credit counters of the respective systems (in other words, a difference between a count value of the credit counter 62 and a count value of the credit counter 63). Note that in a case of a redundant structure having three or more main switches 4, the credit counters 62, 63 are provided correspondingly to the number of buffers 7.

When the cells are inputted to the processing section 5 of the traffic manager 3 from the line card 2 (refer to FIG. 3), the credit counter 50 is incremented by "1" for each cell.

Next, the input cells are copied to the main switches (C, C') 4 in the ACT system and the SBY system by the function of the cell copy section 60 (refer to FIG. 4) of the credit synchronization section 6. The cells copied to each main switch 4 are inputted through the credit counters 62, 63 to the buffer 7 of each main switch 4. At this time, the credit counters 62, 63 are incremented by "1".

After that, in each main switch 4, when the cells accumulated in the buffer 7 are dequeued (in other words, outputted to the switch 8), a control section (not shown) in each main switch 4 instructs the traffic manager 3 to update the credit by transmitting a credit update cell.

Based on the credit update instruction, all of the credit counters 50, 62, and 63 in the traffic manager 3 are decremented by "1". This process is carried out on a cell basis.

Here, a predetermined threshold is preliminarily set for the credit counter 50 of the processing section 5. When the dequeue of the buffer 7 is not carried out because of, for example, a congestion of the main switch 4, the credit update instruction is not executed. Thus, when the counter value of the credit counter 50 exceeds the set threshold, the processing section 5 stops transmitting the cell. As a result, the flow control of the transmission base (the credit base flow control) is attained between the traffic manager 3 serving as the transmission device and the main switch 4 serving as the reception device.

Usually, in the main switches (C, C') 4 employing the duplex redundant structure of the ACT system and the SBY system, depending on a difference in frequencies of master clocks (oscillators) or a difference in traffic between the systems, the dequeue situation is different between the ACT system buffer 7 and the SBY system buffer 7. For this reason, a counter value (J) "8" corresponding to the number of cells remaining in the ACT system buffer 7 in the example shown in FIG. 5 and a counter value "8" of the credit counter (F) 50 and the credit counter (G) 62 in the traffic manager 3 are always equal. However, a counter value (K) "4" corresponding to the number of cells remaining in the SBY system buffer 7, a counter value "4" of the credit counter (H) 63 in the traffic manager 3, and the counter value "8" of the credit counter (F) 50 in the traffic manager 3 are always different.

In the traffic manager 3 shown in FIG. 5, the credit counters 62, 63 and cell control sections 65, 66 in the credit synchronization section 6 employ the duplex redundant structure. The other configurations and operations are similar to those described above, where FIG. 4 is referred to.

Figure 6:
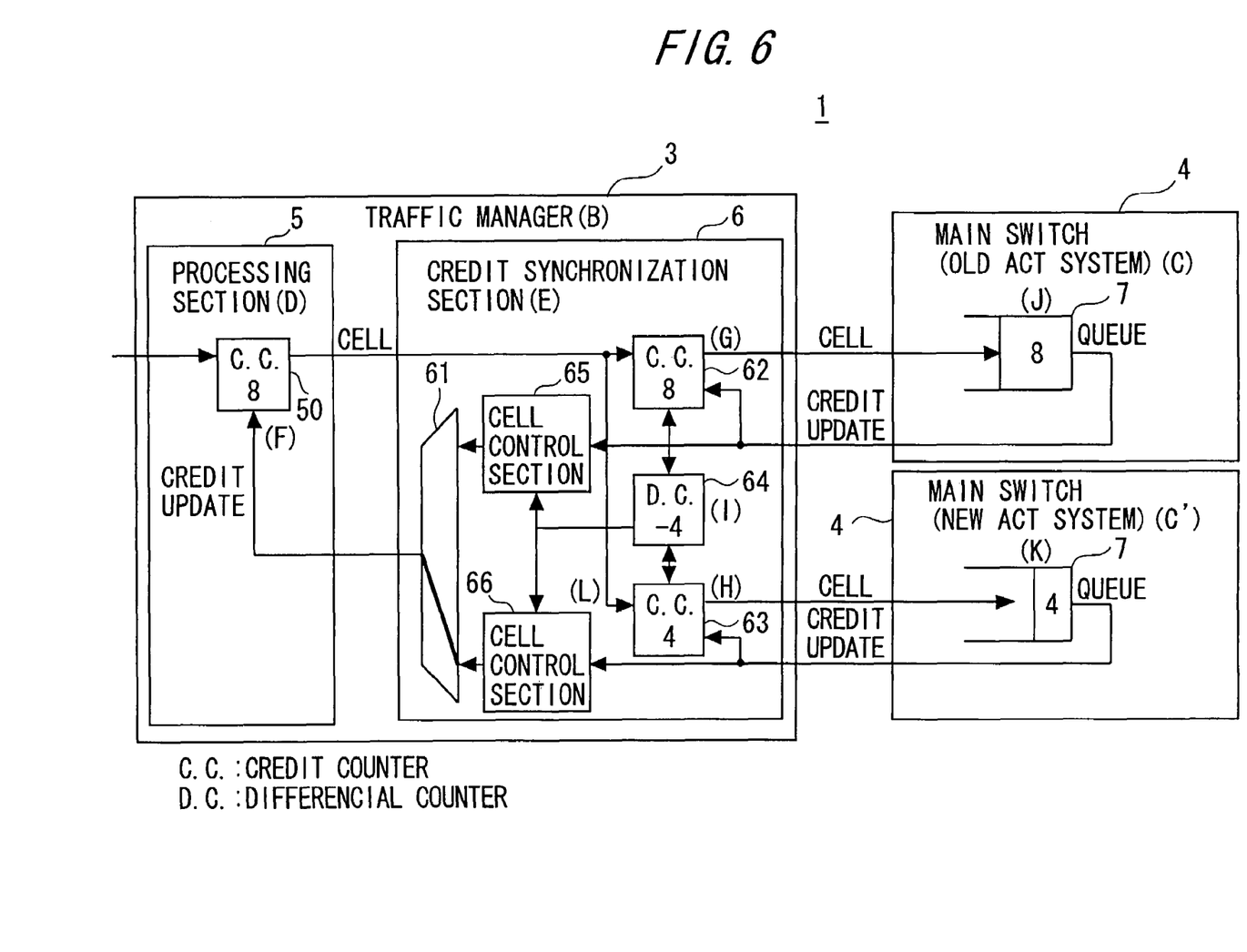
FIG. 6 is a block diagram showing details (including the first operation example) of the traffic manager and the main switch shown in FIG. 3.

FIG. 6 shows a state transition of each member immediately after the system switching is executed from the state shown in FIG. 5.

The differential counter (I) 64 of the credit synchronization section 6 holds a difference "−4" in the counter value between the credit counter 62 and the credit counter 63 immediately after the system switching. In this case, the counter value "4" of the credit counter 63 corresponding to the new ACT system is smaller by 4 as compared with the counter value "8" of the credit counter 62 corresponding to the old ACT system. Thus, in order to absorb the difference, the value of the credit counter 50 in the processing section 5 is required to be subtracted by "4".

Figure 7:
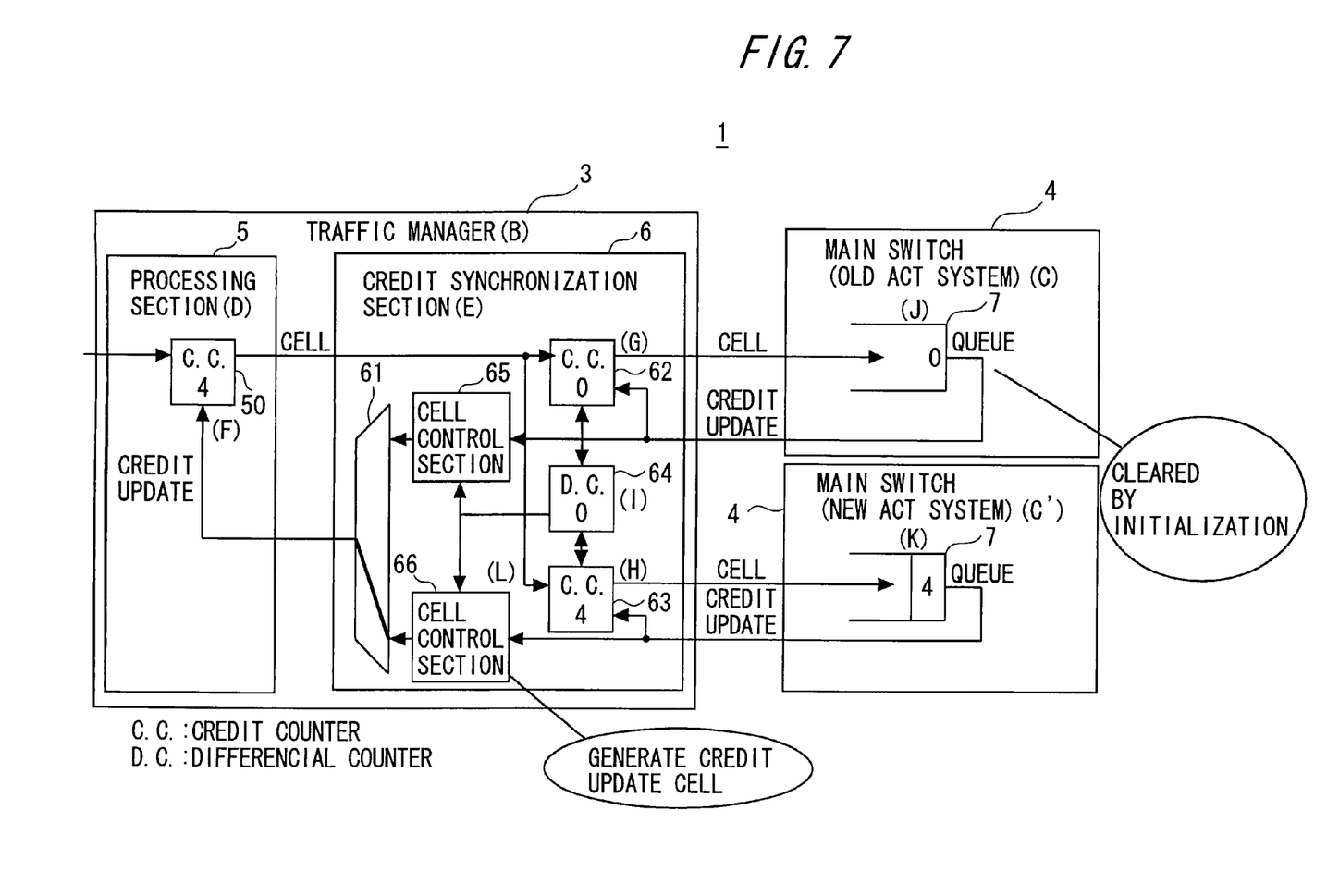
FIG. 7 is a block diagram showing details (including the first operation example) of the traffic manager and the main switch shown in FIG. 3.

The cell control section (L) 66 corresponding to the new ACT system where the difference "−4" in the counter value between the credit counters 62, 63 is inputted from the differential counter 64 generates and transmits four extra credit update cells as shown in FIG. 7. The four credit update cells transmitted from the cell control section 66 are inputted through the ACT system selection section 61 to the credit counter 50. Thus, the counter value of the credit counter 50 becomes "4" equal to the counter value of the credit counter 63 in the new ACT system and the counter value corresponding to the number of cells remaining in the buffer 7 of the new ACT system.

Note that the counter value "8" corresponding to the number of cells remaining in the old ACT system buffer 7 and the counter value "8" of the credit counter 62 are cleared to be "0" by an initialization at the time of the system switching.

[Details of Traffic Manager and Main Switch (Second Operation Example)]

Figure 8:
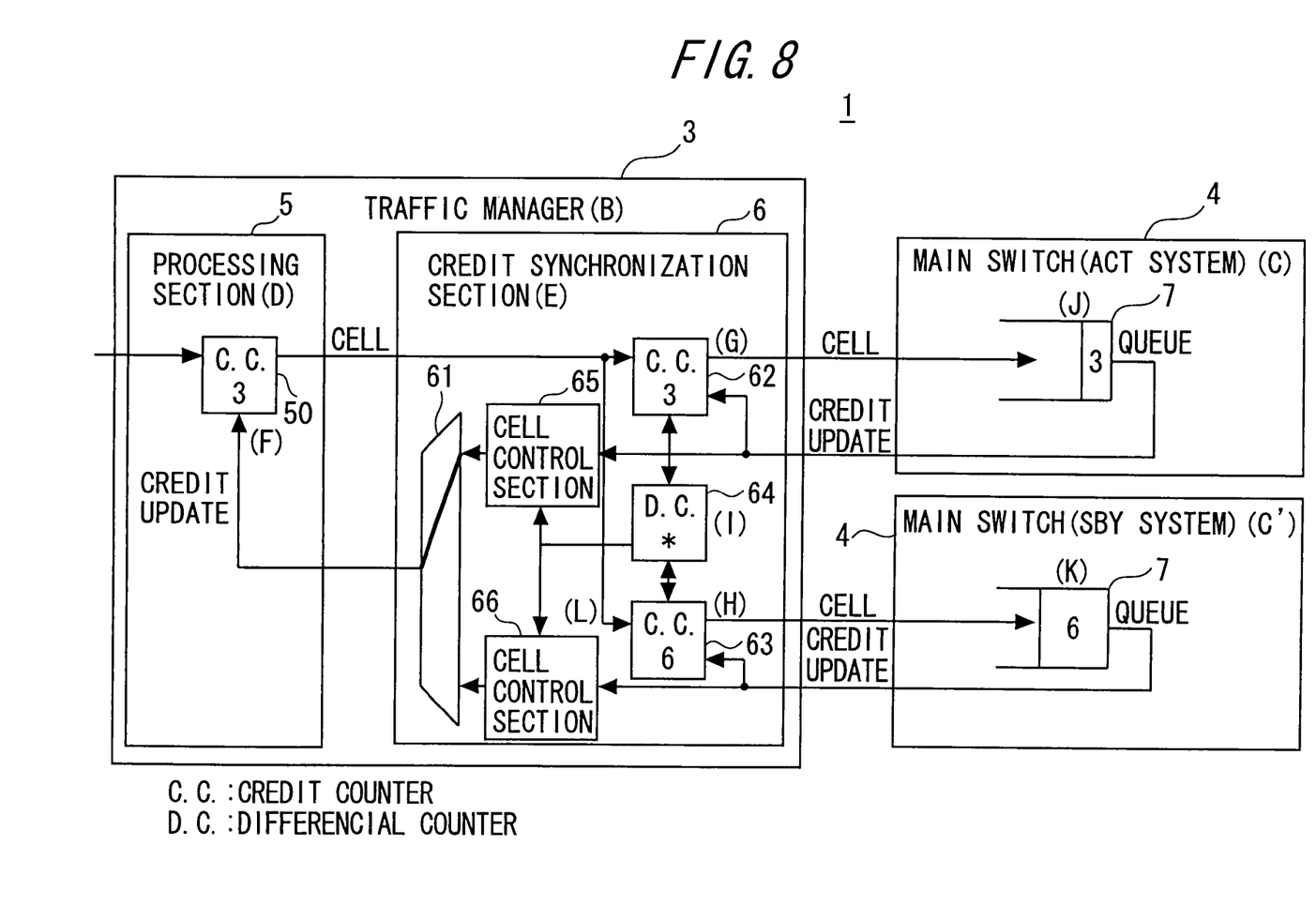
FIG. 8 is a block diagram showing details (including a second operation example) of the traffic manager and the main switch shown in FIG. 3.
Figure 9:
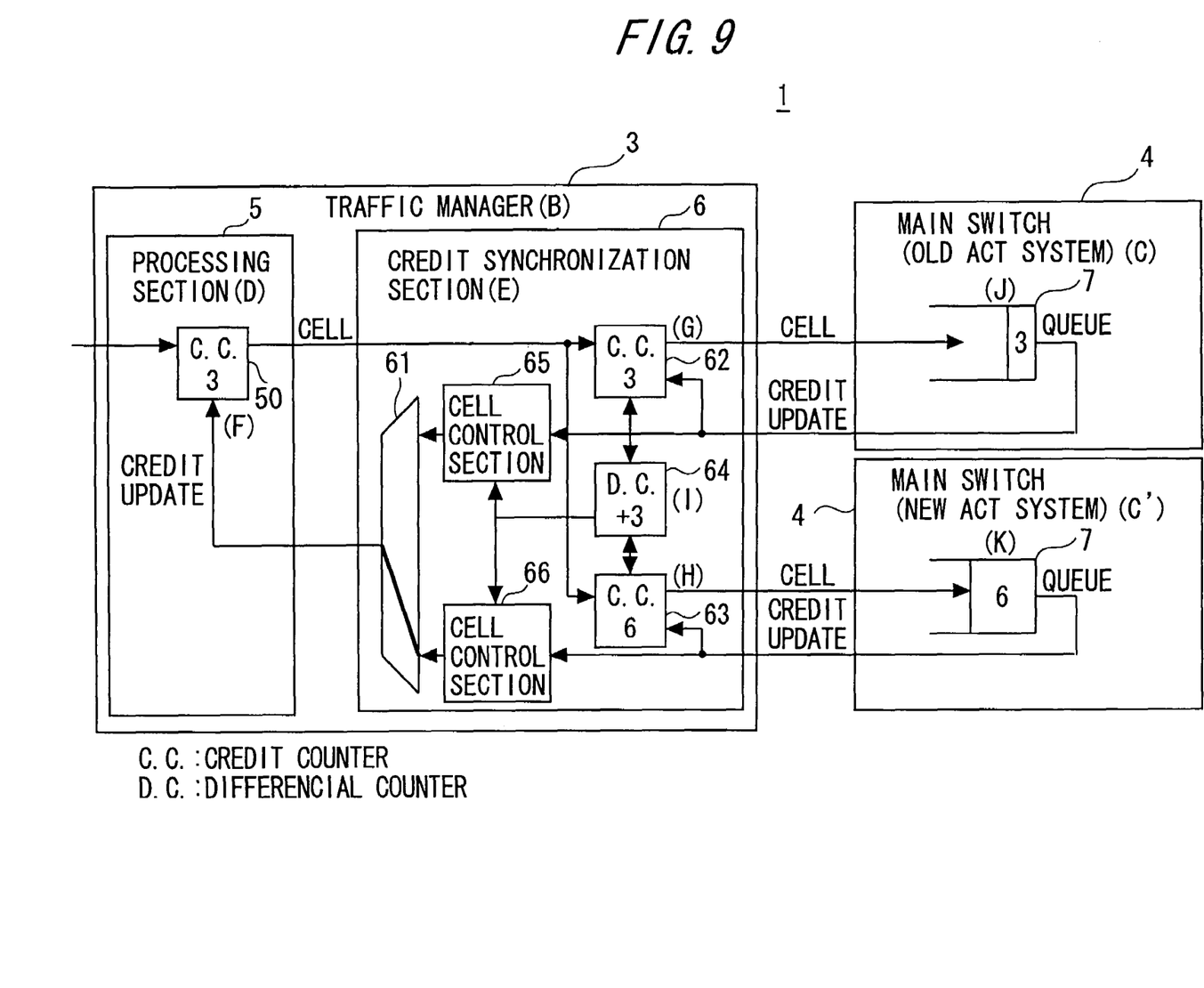
FIG. 9 is a block diagram showing details (including the second operation example) of the traffic manager and the main switch shown in FIG. 3.

FIG. 9 shows a state transition of each member immediately after the system switching is carried out from the state shown in FIG. 8. An example shown in FIG. 9 is a case where the credit value of the new ACT system is greater than that of the old ACT system, contrary to the case shown in FIG. 6 mentioned above.

The differential counter 64 of the credit synchronization section 6 holds a difference "+3" in the counter value between the credit counter 62 and the credit counter 63 immediately after the system switching. In this case, a counter value "6" of the credit counter 63 corresponding to the new ACT system is greater by "3" as compared with the counter value "3" of the credit counter 62 corresponding to the old ACT system. Thus, in order to absorb the difference, the value of the credit counter 50 of the processing section 5 is required to be incremented by "3".

Figure 10:
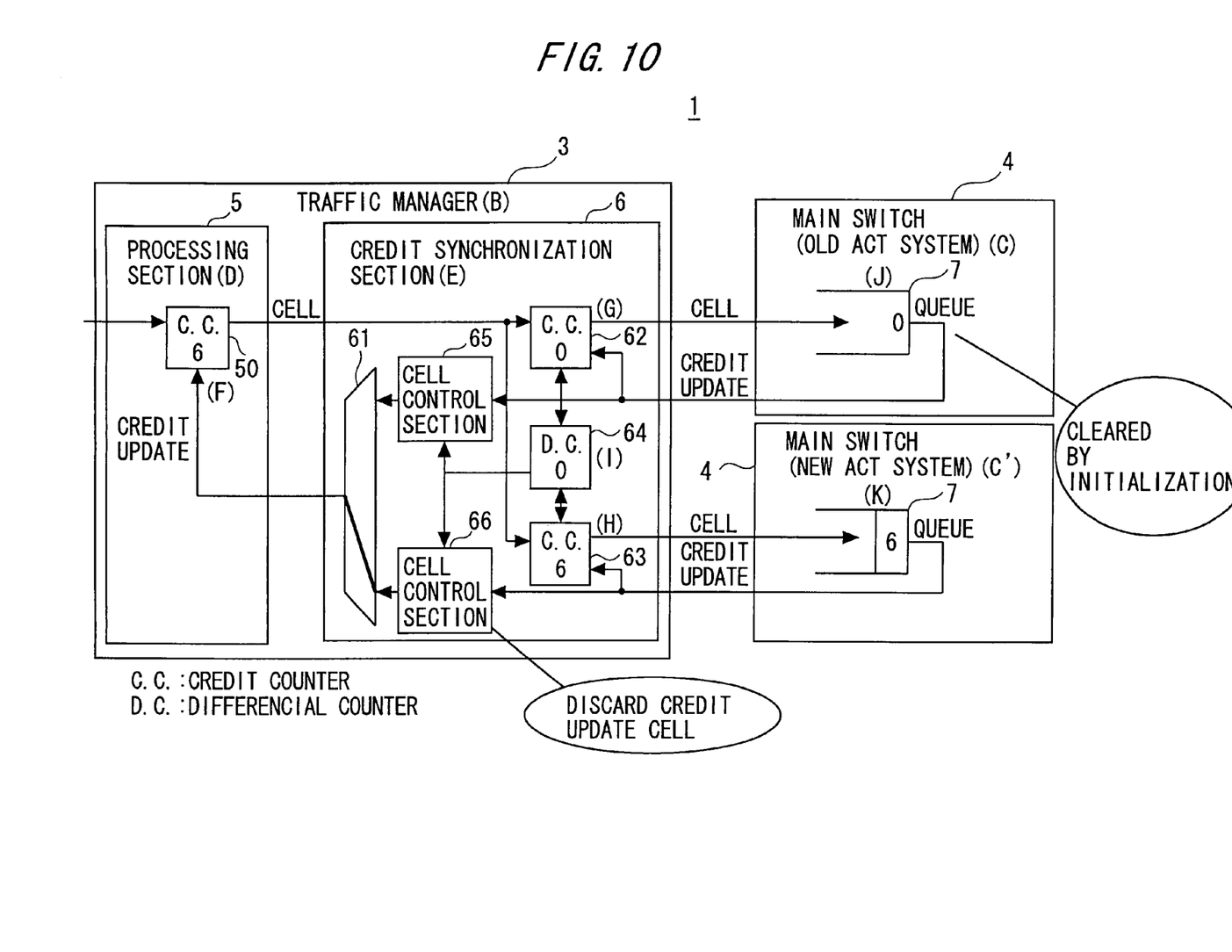
FIG. 10 is a block diagram showing details (including the second operation example) of the traffic manager and the main switch shown in FIG. 3.

The cell control section 66 corresponding to the new ACT system where the difference "+3" in the counter value between the credit counters 62, 63 discards three credit update cells inputted from the main switch 4 of the new ACT system, as shown in FIG. 10, so as to avoid the credit update for the credit counter 50 for three times. Thus, the counter value of the credit counter 50 becomes "6" equal to the counter value of the credit counter 63 of the new ACT system and the counter value corresponding to the number of cells remaining in the buffer 7 of the new ACT system.

Note that the counter value "3" corresponding to the number of cells remaining in the old ACT system buffer 7 and the counter value "3" of the credit counter 62 are cleared to be "0" by the initialization at the time of the system switching.

In the edge router 1 serving as the data transmission device for carrying out the credit base flow control mentioned above, each of the credit counters 50, 62, and 63 can be set to any value by an external firmware. Thus, independently of the state of the transmission of cells, it is possible to carry out the test of the credit counter and the traffic control such as continuous application of back-pressure.

[Credit Update Cell]

A specific format example of the credit update cell described above is shown in FIGS. 11 and 12. As indicated in this example, the credit update cell includes a credit update information area at a particular byte (at a second byte). The credit update information area includes a flow identification ID (transmission flow ID) where the credit corresponding to 6 bits (0-th to fifth bits) should be updated, and operation instruction information corresponding to two bits (sixth and seventh bits).

Figure 11:
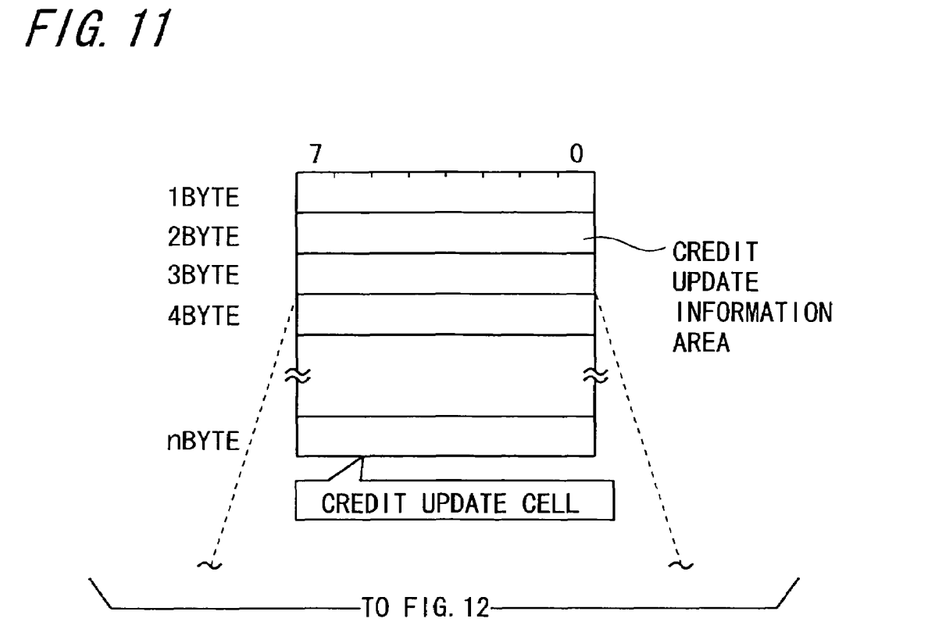
FIG. 11 is a view for explaining a credit update cell.
Figure 12:
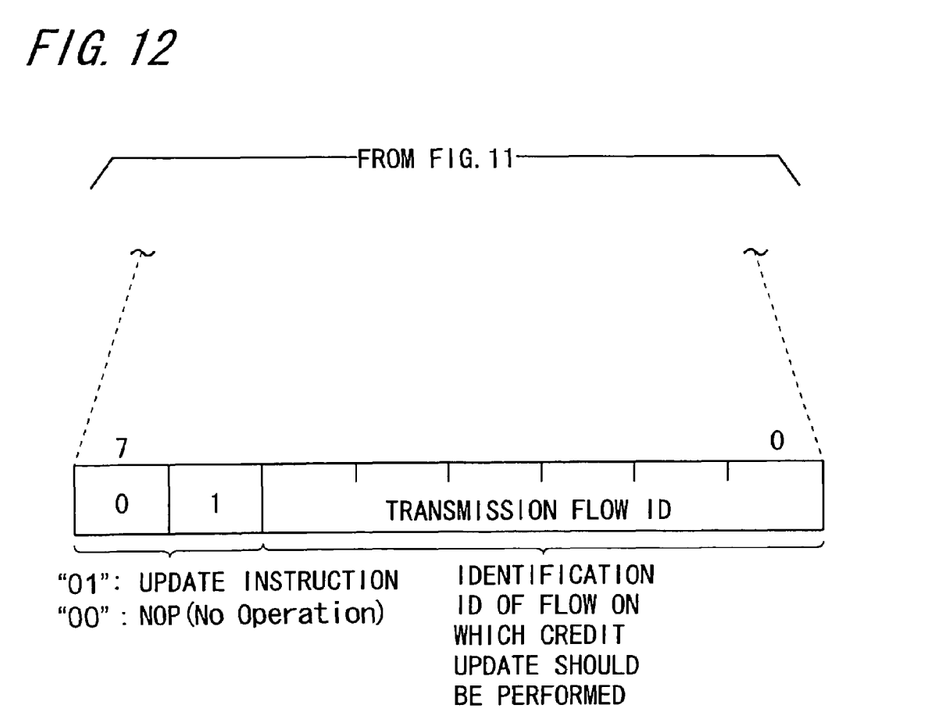
FIG. 12 is a view for explaining the credit update cell.

For example, VPI (Virtual Path Identifier) or VCI (Virtual Cannel Identifier) is set for the flow identification ID in which the credit should be updated. Also, in the operation instruction information, "01" indicates an update instruction and "00" indicates NOP (No Operation). This credit update cell is transmitted from the ACT system main switch 4 and the cell control sections 65, 66 of the traffic manager 3 in the edge router 1.

[Credit Information Collection Command]

Figure 13:
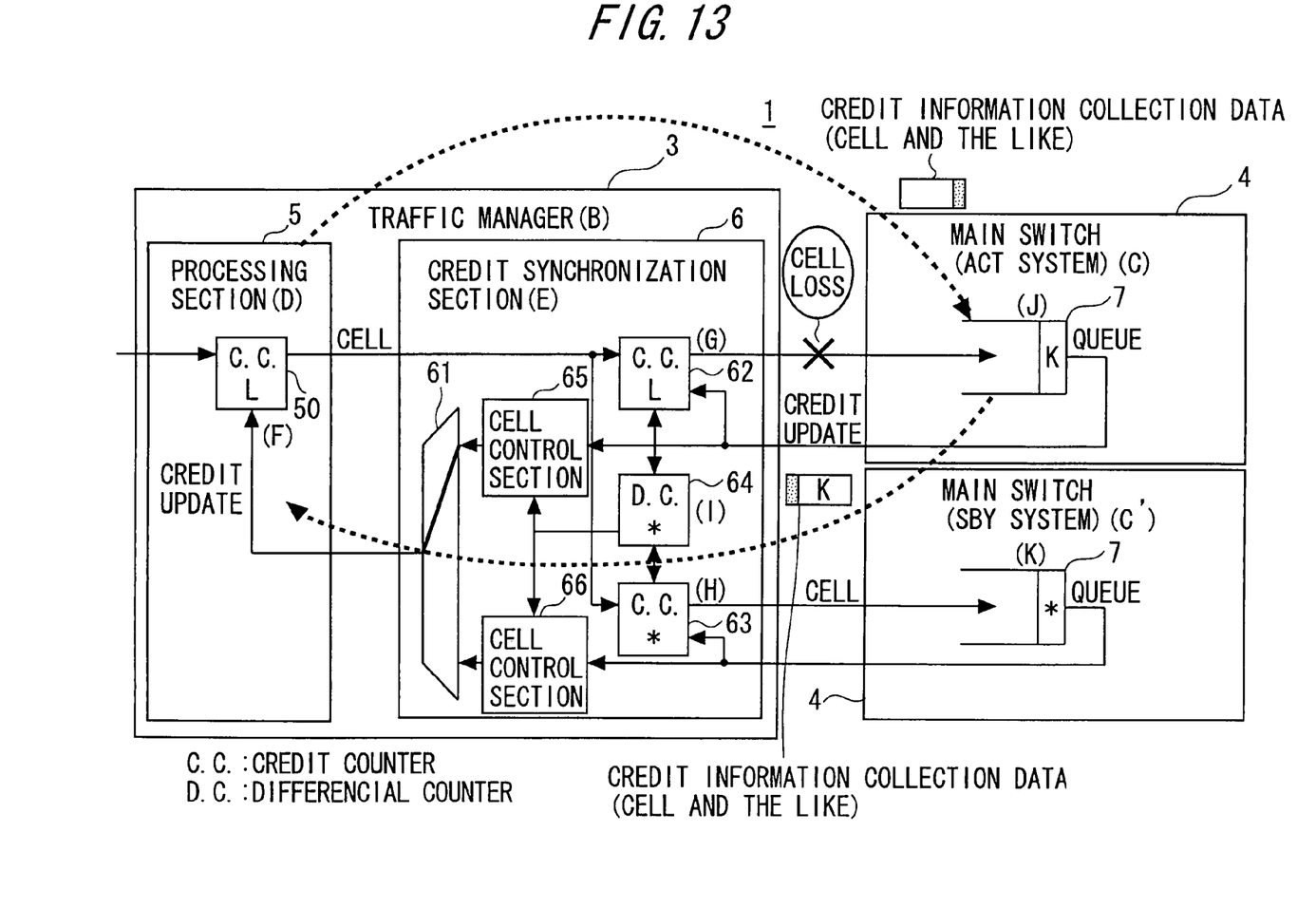
FIG. 13 is a view for explaining a synchronization process for a credit counter using a credit information collection command.

FIG. 13 shows a synchronization process of the credit counter using a credit information collection command.

The credit base flow control is carried out based on the credit update information of the flow control area in the header of the cell. However, as shown in FIG. 13, when a cell loss or the like occurs between the traffic manager 3 and the main switch 4, there is a possibility that the credit update information is discarded and the credit update is not normally executed.

In order to cope with this problem, the processing section 5 of the traffic manager 3 uses an empty slot of a main signal to periodically transmit credit information collection data (cell and the like) of a predetermined format to the ACT system main switch 4. The ACT system main switch 4 writes the self-credit value (the counter value corresponding to the number of cells remaining in the ACT system buffer 7) "K" to the data. This write process is carried out by a control section, which is not shown, in the main switch 4.

The credit information collection data to which the credit value "K" is written is returned (sent back) to the traffic manager 3 from the ACT system main switch 4. The traffic manager 3 updates the counter values of the credit counters 50, 62 from "L" to "K" based on the credit value "K" contained in the returned credit information collection data. In order to update the counter value of the credit counter 50, the returned credit information collection data is inputted through the cell control section 65 and the ACT system selection section 61 to the processing section 5.

Thus, it is possible to avoid the mismatching of the credit value caused by the cell loss between the traffic manager 3 serving as the transmission device and the main switch 4 serving as the reception device.

Figure 14:
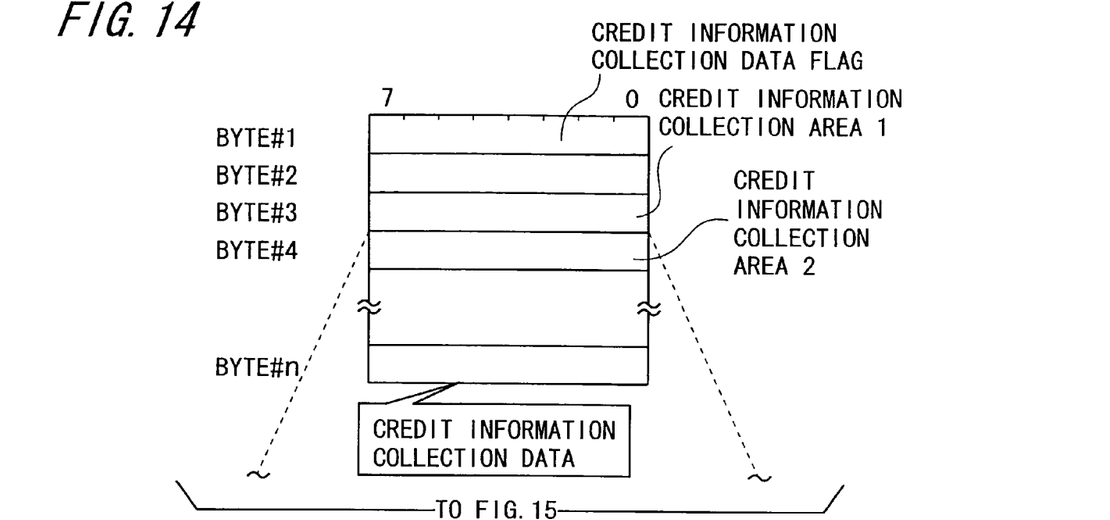
FIG. 14 is a view for explaining credit information collection data.
Figure 15:
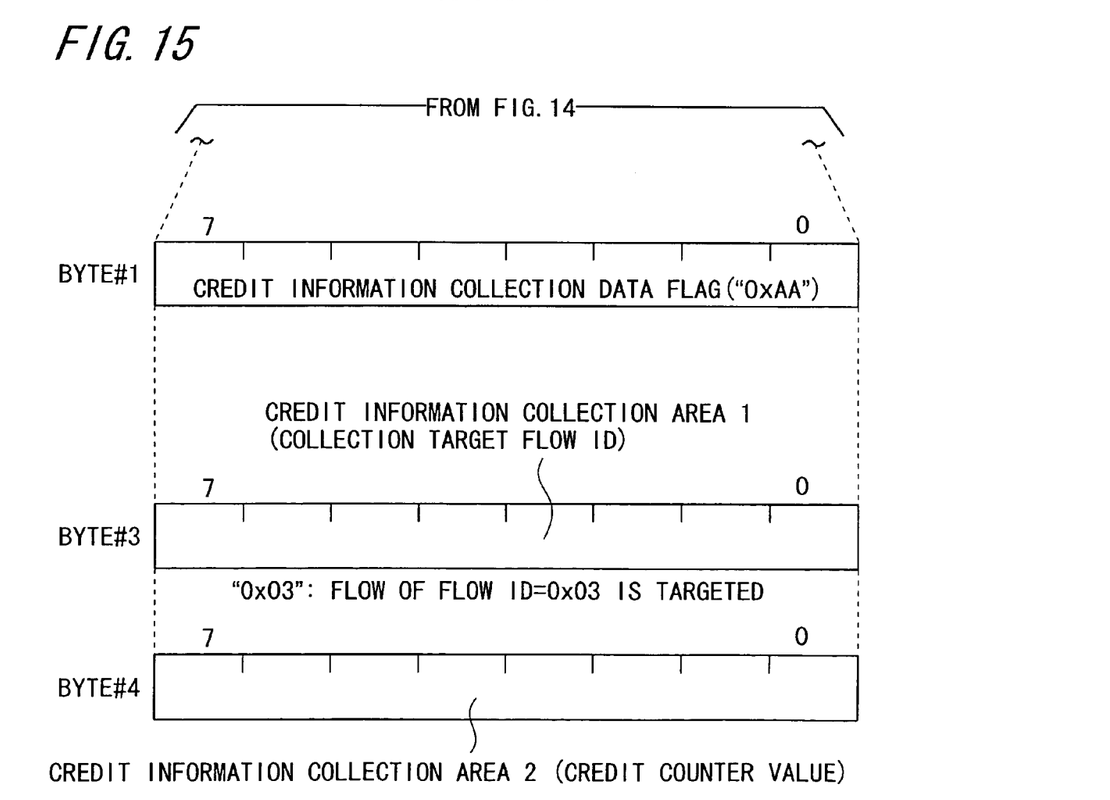
FIG. 15 is a view for explaining the credit information collection data.

A specific format example (in a case of the cell) of the credit information collection data described above is shown in FIGS. 14 and 15. As indicated in this example, the credit information collection data has a credit information collection data flag "0xAA" at the first byte and has first and second credit information collection areas at the third and fourth bytes. A collection target flow ID is set for the first credit information collection area, and the credit value (counter value) is set for the second credit information collection area.

[Effect]

In the transmission base flow control technique of the above-described embodiment, in the case of the occurrence of the system switching between the active system and the preparatory system, it is possible to avoid the situation where the flow control does not function normally because the credit values are mismatched between the reception devices (main switches) of the redundant structure.

In other words, with regard to the credit values of the respective systems, the traffic manager serving as the transmission device manages the number of transmitted data and the updated credit value, apart from a purpose of utilization in the flow control, and avoids an abnormal state of the flow control caused by the fact that the credit value becomes abnormal.

Also, the credit value is managed for each system and the synchronization of the credit values is executed after the system switching. Thus, it is possible to prevent the credit values from being mismatched between the traffic manager side and the main switch side after the switching.

Also, it is possible to avoid the occurrence of problems of the drop in the throughput inside the main switch and the overflow or underflow of the buffer memory after the system switching.

Moreover, even when the cell loss or the like causes the mismatching between the credit values, the credit value of the main switch side is monitored by using the credit information collection command, and the credit counters are matched based on a result of monitoring. Thus, the mismatching between the credit counters can be avoided.

INDUSTRIAL APPLICABILITY

The flow control technique of the transmission base (the flow control technique of the credit base) of the present invention can be especially applied to the traffic control on a flow basis in the data transmission device, such as the router and switchboard, for carrying out the switching on a fixed length or variable length packet base, and the flow control between the traffic manager serving as the transmission device for carrying out the routing control and the main switch serving as the reception device employing the redundant structure.

What is claimed is:

1. A transmission base flow control device which performs data transmission/reception based on a packet form between a transmission device and a reception device having a redundant structure by utilizing a credit value to perform a flow control of a credit base on a flow basis, the transmission base flow control device comprising:
    a first credit counter, which is shared by an active system and a preparatory system of the reception device, for managing the credit value of the active system;
    a second credit counter and a third credit counter for counting the credit values for each system of the active system and the preparatory system of the reception device;
    a differential counter for holding a difference between the credit value counted by the second credit counter and the credit value counted by the third credit counter; and
    a control unit for matching, according to the difference held by the differential counter, the credit values of the first credit counter and the second credit counter or the credit values of the first credit counter and the third credit counter with a credit value corresponding to the reception device of a new active system after switching the system of the reception device.

2. The transmission base flow control device according to claim 1, wherein the differential counter holds a difference between the credit value counted by the second credit counter and the credit value counted by the third credit counter, at the time of switching the system of the reception device.

3. The transmission base flow control device according to claim 1, wherein the transmission device is a traffic manager having a traffic processing function and a routing processing function on a flow basis, and
    the reception device is a switch for switching a packet of an accumulation state in a buffer memory on a fixed length packet basis.

4. The transmission base flow control device according to claim 1, wherein the control unit matches, according to the difference held by the differential counter, the credit values of the first credit counter and the second credit counter or the credit values of the first credit counter and the third credit counter with a credit value corresponding to a packet number remaining in the buffer memory in the reception device of the new active system after switching the system of the reception device.

5. The transmission base flow control device according to claim 1, wherein the reception device of the new active system transmits a credit update packet to the transmission device when the differential counter indicates the difference of a negative value, in order to match the credit value corresponding to the reception device of the new active system, the credit value of the first credit counter, and the credit value of the second credit counter or the third credit counter corresponding to the new active system, with one another.

6. The transmission base flow control device according to claim 1, wherein the transmission device discards the credit update packet transmitted thereto from the reception device of the new active system when the differential counter indicates the difference of a positive value, in order to match the credit value corresponding to the reception device of the new active system, the credit value of the first credit counter, and the credit value of the second credit counter or the third credit counter corresponding to the new active system, with one another.

7. The transmission base flow control device according to claim 1, wherein the transmission device transmits a credit information collection data to the reception device, and the credit value corresponding to the reception device of the active system is collected, and according to the collected credit value, the credit value of the first credit counter is matched with the credit value of the second credit counter or the third credit counter corresponding to the active system.

* * * * *